Patented Jan. 9, 1951

2,537,759

UNITED STATES PATENT OFFICE 2,537,759

LOW TEMPERATURE FILTRATION OF HYDROCARBON POLYMERS

Arthur B. Hersberger, Drexel Hill, Pa., assignor to The Atlantic Refining Company, Philadelphia, Pa., a corporation of Pennsylvania No Drawing. Original application January 8, 1944, Serial No. 517,610. Divided and this application February 5, 1947, Serial No. 726,721

5 Claims. (Cl. 260—85.3)

This invention relates to the separation of hydrocarbon polymers of high molecular weight from reaction mixtures from which they are difficultly separable by ordinary filtration.

This application is a division of my copending application Serial No. 517,610, filed January 8, 1944, now abandoned, and entitled "Filtration Process."

When isobutylene or a mixture of isobutylene with a diene, such as isoprene, butadiene, and dimethyl butadiene, is contacted in liquid phase at low temperatures, e. g., —70° C. to —130° C. with a fine spray of a catalyst solution consisting of an active Friedel-Crafts type halide catalyst dissolved in a low molecular weight alkyl monohalide, the polymer product forms as fine discrete particles in the reaction mixture and is extremely difficult to recover. If the reaction mixture is permitted to warm up prior to filtration, viscous sticky gels are formed which adhere to the equipment. On the other hand, if filtration of the mixture is attempted at low temperature, because of the amorphous nature of the polymer, a film immediately forms over the filter plate which effectively prevents filtration. The use in the filtration of conventional filter aids such as diatomaceous earths, glass beads, carbon black, and the like is unsatisfactory regardless of the temperature at which the filtration is conducted because such materials cannot be readily separated from the polymer.

According to the present invention, I filter the reaction mixture containing polymer, unreacted hydrocarbons, catalyst, and solvent, using finely divided particles of ice or solidified carbon dioxide as the filter aid. The filtration, as so carried out, is quite rapid and the separation of the filter aid from the polymer subsequent to the filtration presents no problem.

The amount of filter aid incorporated with the mixture to be filtered according to the invention may vary considerably, but in general, the greater the amount of filter aid used, the more porous the filter cake and the faster the filtration. Ordinarily, I use an amount of filter aid equal to from about 0.5 to five times the weight of the polymer in the mixture. Care should be exercised to distribute the filter aid evenly throughout the mixture which must, of course, be maintained at a temperature below the melting or sublimation point of the filter aid, both during the incorporation of the filter aid and during the filtration.

In using ice particles as the filter aid, I may employ powdered or finely pulverized ice or ice crystals produced as by spraying water into a current or chamber of air cooled to a temperature below about —20° F. More preferably, however, I form the desired dispersion of ice particles by introducing a fine spray of water into the mixture itself immediately upon completion of the polymerization reaction and while maintaining the mixture under agitation.

Following the filtration, the filter aid may be separated from the filter cake by simply warming the filter cake and drawing off the resulting water or gaseous carbon dioxide as the case may be. As an alternative procedure, the filter aid may be removed by steaming the filter cake. This practice is advantageous in that substantially the last traces of the unreacted hydrocarbons and solvent may be thereby removed from the polymer. When operating with finely divided particles of solidified carbon dioxide, produced as by crushing or pulverizing cubes or fragments of solidified carbon dioxide, it may be advantageous for economic reasons to provide for the recovery of the gaseous carbon dioxide resulting upon warming or steaming of the filter cake. Prior to removing the filter aid, it is desirable to wash the filter cake with methanol or other lower aliphatic alcohol such as ethanol, isopropanol, etc., in order to deactivate the catalyst present in the filter cake. The alcohol is preferably chilled before use to a temperature approximating that of the filter cake.

The following examples are submitted in illustration of the detailed practice of my invention. Examples III and VI illustrate a modification of the invention in which I combine with the filter aid an agent capable of deactivating the catalyst. When this is done, the above mentioned alcohol wash may be omitted.

Example 1

A mixture consisting of one part by weight of isoprene and 32 parts by weight of isobutylene was diluted with an equal amount of ethyl chloride and charged to a reaction vessel wherein it was chilled to a temperature of —120° C. through the use of liquefied nitrogen. A catalyst solution consisting of anhydrous aluminum chloride dissolved in ethyl chloride was then injected into the diluted hydrocarbon mixture through a spray head adapted to produce an almost mist-like spray. The catalyst solution contained about 0.44 per cent aluminum chloride, and was chilled to a temperature of approximately —65° C. The product of the reaction was a rubber-like polymer which formed as fine discrete particles in the reaction mixture. Addition of the catalyst solution was continued until approximately 50 per cent of the hydrocarbons were converted to polymer. Thereafter, a fine dispersion of ice particles was produced in the mixture by adding water in the form of a fine spray while maintaining the mixture under agitation. The mixture of polymer, ice particles, unreacted hydrocarbons, catalyst, and ethyl chloride was then poured on a chilled copper filter (—70° C.) which was provided with a vacuum line. Filtration of the mixture took place rapidly under about 400 mm. vacuum. The ice-polymer filter cake was quite porous and did not adhere to the copper filter. Separation of the ice filter aid was effected by heating the filter cake and separating the resulting water.

*Example II*

The experiment of Example I was repeated but instead of forming the ice particles in the reaction mixture, finely powdered ice was added thereto. The ice particles acted to increase the porosity of the filter cake and to accelerate the filtration.

*Example III*

In this instance, the same procedure and conditions were employed as in the experiment of Example I, except that the water injected into the reaction mixture contained ammonium hydroxide. The ammonia concentration was about 1 per cent. The thus added ammonia served to deactivate the catalyst present in the mixture and avoided contamination of the polymer with undesirable low molecular weight polymers.

Instead of introducing water containing ammonia into the mixture, particles of frozen ammonia water produced apart from the mixture may, of course, be used.

*Example IV*

The procedure and conditions were the same as in Example I, except that the filter cake, before being heated to separate the filter aid as water, was washed with chilled methyl alcohol to deactivate the catalyst present therein. The washing with methyl alcohol served also to displace most of the unreacted hydrocarbons and ethyl chloride remaining in the cake. Such of the wash alcohol as was not recovered as filtrate became dissolved in the water resulting when the filter cake was heated.

*Example V*

Finely powdered dry ice (solidified carbon dioxide) was substituted as the filter aid. The results were substantially identical with those obtained using powdered ice. Separation of the filter aid was effected by steaming the filter cake to convert the filter aid to gaseous $CO_2$.

*Example VI*

Powdered dry ice was again employed as the filter aid, but in this instance, before being added to the mixture, it was exposed to ammonia gas for a period of about ten minutes. The ammonia-impregnated material acted as an efficient filter aid and at the same time was effective in deactivating the catalyst. It was unnecessary to wash the filtrate with alcohol.

Other methods of impregnating the dry ice with ammonia may be used. For example, ammonia water may be poured over the dry ice or the filter aid may be prepared by compressing a mixture of gaseous carbon dioxide and ammonia gas. The amount of ammonia employed is always sufficient to deactivate all of the catalyst present in the mixture filtered.

Other active Friedel-Crafts type halide catalysts which may be used in lieu of aluminum chloride in the low temperature polymerization reaction leading to the production of the polymer-containing reaction mixtures with which the present invention is concerned include aluminum bromide, titanium tetrachloride, boron fluoride.

While methyl and ethyl chloride are preferred as solvents in the reaction, other low molecular weight alkyl monohalides such as methyl bromide and iodide, ethyl bromide and iodide, isopropyl chloride, bromide, and iodide, and the like, may be employed. The corresponding fluorides although applicable are in general less satisfactory. It is believed that methyl and ethyl chloride act in some measure to promote the activity of the catalyst.

My invention is not limited to the separation or recovery of the polymers specifically mentioned herein but may also be applied, for example, to the separation of a polymer prepared according to my application Serial No. 486,474, filed May 8, 1943, now abandoned; or according to my application Serial No. 486,475, filed on the same date, now abandoned. These applications relate to the utilization of alpha substituted styrenes in the production of useful polymerization products which may be either resinous or rubber-like in character.

I claim:

1. A process for separating a solid hydrocarbon polymer from a low temperature polymerization reaction mixture in which the polymer is formed as small discrete particles, which comprises incorporating finely divided particles of solidified carbon dioxide with the low temperature polymerization reaction mixture in an amount between 0.5 and 5 times the weight of the polymer in the mixture, filtering the mixture at a temperature below the sublimation temperature of the solid carbon dioxide, and subjecting the filter cake comprising the polymer and said carbon dioxide particles to heat sufficient to sublime said carbon dioxide.

2. The method of separating a solid hydrocarbon polymer from a reaction mixture produced by contacting a liquid mixture of isobutylene and a conjugated diolefin of 4 to 6 carbon atoms at a temperature between —80° C. and —130° C. with a fine spray of a catalyst solution consisting of an aluminum halide catalyst dissolved in an alkyl halide containing not more than 3 carbon atoms, which comprises incorporating finely divided particles of solidified carbon dioxide with the chilled mixture in an amount between 0.5 and 5 times the weight of the polymer in the mixture, filtering the mixture at a temperature below the sublimation temperature of the carbon dioxide, and subjecting the filter cake comprising the polymer and said carbon dioxide particles to heat sufficient to sublime said carbon dioxide.

3. The method of separating a solid hydrocarbon polymer from a reaction mixture produced by contacting a liquid mixture of isobutylene and isoprene at a temperature between —80° C. and —130° C. with a fine spray of a cataylst solution consisting of an aluminum halide catalyst dissolved in an alkyl halide containing not more than 3 carbon atoms, which comprises incorporating finely divided particles of solidified carbon dioxide with the chilled mixture in an amount between 0.5 and 5 times the weight of the polymer in the mixture, filtering the mixture at a temperature below the sublimation temperature of the carbon dioxide, and subjecting the filter cake comprising the polymer and said carbon dioxide particles to heat sufficient to sublime said carbon dioxide.

4. In the filtration of solid hydrocarbon polymers from a low temperature polymerization reaction mixture in which the polymer is formed as small discrete particles which normally clog the filter and render filtration unsatisfactory, the improvement which comprises incorporating with the low temperature polymerization reaction mixture finely divided particles of solid carbon dioxide in an amount between 0.5 and 5 times the weight of the polymer in the mixture, and thereafter filtering the mixture at a temperature below the sublimation temperature of the solid carbon dioxide.

5. A method of separating a mass of discrete particles of isobutylene-conjugated diolefin polymer from a reaction mixture at a temperature between $-80°$ C. and $-130°$ C., which comprises incorporating finely divided particles of solidified carbon dioxide with the chilled reaction mixture in an amount between 0.5 and 5 times the weight of the polymer in the mixture, filtering the mixture at a temperature below the sublimation temperature of the carbon dioxide, and subjecting the filter cake comprising the polymer and said carbon dioxide particles to heat sufficient to sublime said carbon dioxide.

ARTHUR B. HERSBERGER.

REFERENCES CITED

The following references are of record in the file of this patent:

UNITED STATES PATENTS

| Number | Name | Date |
|---|---|---|
| 1,770,052 | Voorhees | July 8, 1930 |
| 2,291,510 | Thomas | July 28, 1942 |
| 2,384,916 | Holmes | Sept. 18, 1945 |
| 2,389,693 | Sparks | Nov. 27, 1945 |